United States Patent
Ikelle (10) Patent No.: US 6,327,537 B1
(45) Date of Patent: Dec. 4, 2001

(54) MULTI-SHOOTING APPROACH TO SEISMIC MODELING AND ACQUISITION

(76) Inventor: Luc T. Ikelle, 6203 Queenslock Cir., Bryan, TX (US) 77802

( * ) Notice: Subject to any disclaimer, the term of this patent is extended or adjusted under 35 U.S.C. 154(b) by 0 days.

(21) Appl. No.: 09/356,571

(22) Filed: Jul. 19, 1999

(51) Int. Cl.$^7$ ........................................................ G01V 1/48
(52) U.S. Cl. ................................................. 702/14; 367/73
(58) Field of Search ................................ 702/14, 16, 17, 702/18; 367/73

(56) References Cited

U.S. PATENT DOCUMENTS

| | | | |
|---|---|---|---|
| 3,629,798 | 12/1971 | Rockwell | 367/36 |
| 4,319,347 | 3/1982 | Savit | 367/52 |
| 4,486,866 | 12/1984 | Muir | 367/39 |
| 4,598,391 | 7/1986 | Muir | 367/25 |
| 4,601,022 | 7/1986 | Muir | 367/14 |
| 4,607,353 | 8/1986 | Muir | 367/39 |
| 4,780,859 | 10/1988 | Hadidi et al. | 367/43 |
| 4,837,723 | 6/1989 | Peacock | 708/300 |
| 4,852,068 | 7/1989 | Track | 367/57 |
| 4,860,265 | 8/1989 | Laster et al. | 367/73 |
| 4,875,166 | 10/1989 | Carroll et al. | 702/17 |
| 5,181,171 | 1/1993 | McCormack et al. | 702/14 |
| 5,404,296 * | 4/1995 | Moorhead | 702/14 |
| 5,511,037 | 4/1996 | Randall et al. | 367/33 |
| 5,719,821 | 2/1998 | Sallas et al. | 367/41 |
| 5,721,710 | 2/1998 | Sallas et al. | 367/41 |
| 5,742,740 | 4/1998 | McCormack et al. | 706/14 |
| 5,781,503 | 7/1998 | Kim | 367/45 |
| 5,793,702 | 8/1998 | Paffenholz | 367/24 |
| 5,850,622 | 12/1998 | Vassiliou et al. | 702/17 |
| 5,924,049 * | 7/1999 | Beasley et al. | 702/17 |
| 5,995,904 * | 11/1999 | Willen et al. | 702/14 |

FOREIGN PATENT DOCUMENTS

| | | |
|---|---|---|
| 2453873 | 6/1975 | (DE) . |
| 972444 | 11/1982 | (SU) . |

OTHER PUBLICATIONS

"Microcomputer Assisted, Single Beam, Photoacoustic Spectrometer System For The Study of Solids", "Analytical Chemistry, vol. 50, No. 4" in Apr. of 1978, pp. 587–591.

* cited by examiner

Primary Examiner—Donald E. McElheny, Jr.
(74) Attorney, Agent, or Firm—Richard C. Litman (57) ABSTRACT

A multi-shooting approach to seismic modeling and acquisition where several shot gathers can be generated simultaneously. The method is called a multi-shooting approach to seismic modeling and acquisition. A multi-shooting modeling method is disclosed which may be carried out on a computer system in either an explicit or an implicit manner. A multi-shooting acquisition method is also disclosed. The finite difference technique has the ability to generate elastic waves from several locations and at different time intervals simultaneously. The multi-shooting approach is based on the property of the finite difference technique. The decoding solution exploits the fact that specific time delays can be imposed between the various shots and that two closely space shooting points produce nearly identical responses.

6 Claims, 11 Drawing Sheets

MULTI-SHOOTING APPROACH TO SEISMIC MODELING AND ACQUISITION

BACKGROUND OF THE INVENTION

1. Field of the Invention

The present invention relates to the analysis of seismic data and, more particularly, to data acquisition and processing systems and methods operable to supplement and/or optimize the analysis of seismic data.

2. Description of the Related Art

Hydrocarbon reservoirs are increasingly found in smaller traps in geologically complex areas, where they are not easy to identify or evaluate. The ability to simulate accurately and in real time seismic surveys by propagating elastic waves in complex inhomogeneous media can help improve the discovery rates and even the production of such reservoirs. Seismic surveying is a technique in which sound generated by a seismic (shot) source is received (and recorded) by a receiver or number of receivers after it has been reflected, refracted, or otherwise affected by geological structures within the body of the earth.

The problem of simulating seismic surveys corresponds to solving the differential equations which controls the wave propagation in the earth under a set of initial, final, and boundary conditions. The most successful numerical techniques for solving these differential equations include (i) finite difference methods based on numerical approximations of derivatives, (ii) ray tracing methods, (iii) reflectivity methods, and (iv) scattering methods based on Born or Kirchhoff approximations. These techniques differ by their regime of validity, their cost, and their usefulness in the development of interpretation tools like inversion. When an adequate discretization in space and time which permits an accurate computation of derivatives of the wave equation is possible, the finite difference technique is the most accurate tool for simulating elastic wave propagation through geologically complex models.

The use of finite difference modeling has risen dramatically in the past decade. The 1980s, the simulation of seismic surveys by finite-difference modeling was the domain of the academic, postdoctoral researcher or the similarly trained specialist with many years of grounding in the area. Recently, more and more engineers and interpreters in industry and even in the field operations are using the two-dimensional version of finite difference modeling to simulate seismic surveys. Their interest is motivated by the ability of finite-difference modeling to accurately model wave propagation through geologically complex ares. Moreover, it is very often easy to use. However, for finite difference modeling to become fully reliable for oil and gas exploration and production, three dimensional finite difference modeling cost-effective versions must be developed.

Three dimensional finite difference modeling has been a longstanding challenge for seismologists, in particular for petroleum seismologists because their needs are not limited to one simulation but thousands and thousands of simulations. Each simulation corresponds to a shot gather. Consider the simulations of elastic wave propagation through a complex geological discretized into 850×850×500 cells. The waveforms are received for 4000 timesteps. It has been estimated that it will take 10 years of computation time on Origin 2000 with 20 CPUs to produce a small three dimensional survey of 40,000 shots. That is why most three dimensional finite difference modeling has been limited to borehole studies (at the vicinity of the well) where the grid size is about 100 times smaller. One alternative to three dimensional finite difference modeling generally put forward by seismologists is the hybrid method where two modeling techniques (e.g., ray tracing and finite difference) are coupled together to improve the modeling accuracy or to reduce the computation time. For complex geological models containing significant lateral variations, this type of coupling is very difficult to perform or operate. Moreover, the connectivity of the wavefield from one modeling technique to another sometime produce significant amplitude error and even phase distortion in data obtained by the hybrid method.

The related art is represented by the following patents of interest.

U.S. Pat. No. 3,629,798, issued on Dec. 21, 1971 to Donald W. Rockwell, describes a method and system for refraction seismic exploration wherein detectors are provided for receiving refraction seismic signals generated from a first location and for subsequently receiving additional refraction seismic signals generated from a second location. Rockwell does not show or suggest a multi-shooting approach to seismic modeling and acquisition according to the claimed invention.

U.S. Pat. No. 4,319,347, issued on Mar. 9, 1982 to Carl H. Savit, describes a seismic system for the systematic surveying of extensive prospects which are responsive to significatly higher frequencies than systems which have been employed heretofore. Savit does not show or suggest a multi-shooting approach to seismic modeling and acquisition according to the claimed invention.

U.S. Pat. No. 4,486,866, issued on Dec. 4, 1984 to Francis Muir, describes a method of seismic exploration using non-impulsive vibratory sources activated by stationary, Gaussian codes. Muir '886 does not show or suggest a multi-shooting approach to seismic modeling and acquisition according to the claimed invention.

U.S. Pat. No. 4,598,391, issued on Jul. 1, 1986 to Francis Muir, describes a method of seismic exploration using non-impulsive vibratory sources activated by stationary, Gaussian codes in a wellbore environment. Muir '391 does not show or suggest a multi-shooting approach to seismic modeling and acquisition according to the claimed invention.

U.S. Pat. No. 4,601,022, issued on Jul. 15, 1986 to Francis Muir, describes a method of seismic exploration using non-impulsive vibratory sources activated by stationary, Gaussian codes in urban areas. Muir '022 does not show or suggest a multi-shooting approach to seismic modeling and acquisition according to the claimed invention.

U.S. Pat. No. 4,607,353, issued on Aug. 19, 1986 to Francis Muir, describes a method of seismic exploration using non-impulsive vibratory sources activated by filtered stationary, Gaussian codes. Muir '353 does not show or suggest a multi-shooting approach to seismic modeling and acquisition according to the claimed invention.

U.S. Pat. No. 4,780,859, issued on Oct. 25, 1988 to Mohamed T. Hadidi et al., describes a method to process seismic data to yield useful information regarding the subsurface area explored, wherein the acquired seismic data is autocorrelated and the amplitude spectrums are estimated, stacked, and averaged to reduce the effects of nonwhite reflectivity upon the data. Hadidi et al. do not show or suggest a multi-shooting approach to seismic modeling and acquisition according to the claimed invention.

U.S. Pat. No. 4,837,723, issued on Jun. 6, 1989 to Kenneth L. Peacock, describes a method and apparatus for continuous time-variant digital filtering of a digitized signal wherein the input digitized signal is separated into discrete windows. Peacock does not show or suggest a multi-shooting approach to seismic modeling and acquisition according to the claimed invention.

U.S. Pat. No. 4,852,068, issued on Jul. 25, 1989 to Antoine Track, describes a method of seismic exploration by filtering a two-dimensional signal g(z,t) built up from a set of signals $g_i(t)$ for 1<i<n as produced by at least one seismic wave detector placed at different depths $Z_1, \ldots, Z_i, \ldots, Z_n$ in a borehole. Track does not show or suggest a multi-shooting approach to seismic modeling and acquisition according to the claimed invention.

U.S. Pat. No. 4,860,265, issued on Aug. 22, 1989 to Stanley J. Laster et al., describes a method of using f-k filtering to restore coherent events to missing traces in seismic data such that the restored trace is consistent with coherent events in the vicinity of the restored trace. Laster et al. do not show or suggest a multi-shooting approach to seismic modeling and acquisition according to the claimed invention.

U.S. Pat. No. 4,875,166, issued on Oct. 17, 1989 to Paul E. Carroll et al., describes a method and apparatus for increasing the effective bandwidth of a geophysical data acquisition system for recording seismic signals returning from the earth. Carroll et al. do not show or suggest a multi-shooting approach to seismic modeling and acquisition according to the claimed invention.

U.S. Pat. No. 5,181,171, issued on Jan. 19, 1993 to Michael D. McCormack et al., describes an adaptive, or neural, network and a method of operating the same which is particularly adapted for performing first break analysis for seismic shot records. McCormack et al. '171 do not show or suggest a multi-shooting approach to seismic modeling and acquisition according to the claimed invention.

U.S. Pat. No. 5,511,037, issued on Apr. 23, 1996 to Russel R. Randall et al., describes a more correct conversion of measurement while drilling data normally acquired at evenly spaced time intervals, but unevenly spaced depth intervals, into evenly spaced depth intervals so that readily available methods of data processing, analysis, and presentation can be utilized. Randall et al. do not show or suggest a multi-shooting approach to seismic modeling and acquisition according to the claimed invention.

U.S. Pat. No. 5,719,821, issued on Feb. 17, 1998 to John J. Sallas et al., describes a method and apparatus for performing a vibratory seismic survey, where multiple vibratory sources are activated simultaneously. Sallas et al. '821 do not show or suggest a multi-shooting approach to seismic modeling and acquisition according to the claimed invention.

U.S. Pat. No. 5,721,710, issued on Feb. 24, 1998 to John J. Sallas et al., describes a method and apparatus for performing a vibratory seismic survey, where multiple vibratory sources are activated simultaneously. Sallas et al. '710 do not show or suggest a multi-shooting approach to seismic modeling and acquisition according to the claimed invention.

U.S. Pat. No. 5,742,740, issued on Apr. 21, 1998 to Michael D. McCormack et al., describes an adaptive, or neural, network and a method of operating the same which is particularly adapted for performing first break analysis for seismic shot records. McCormack et al. '740 do not show or suggest a multi-shooting approach to seismic modeling and acquisition according to the claimed invention.

U.S. Pat. No. 5,781,503, issued on Jul. 14, 1998 to Young C. Kim, describes a method for attenuating source-generated surface wavetrains in a set of seismic data traces. Kim does not show or suggest a multi-shooting approach to seismic modeling and acquisition according to the claimed invention.

U.S. Pat. No. 5,793,702, issued on Aug. 11, 1998 to Josef Paffenholz, describes a method for measuring the water bottom reflectivity wherein a two-way water layer travel time is derived from duel mode seismic sensor data by cross-correlating the Fourier transforms of the sum and difference of the velocity and pressure signatures. Paffenholz does not show or suggest a multi-shooting approach to seismic modeling and acquisition according to the claimed invention.

U.S. Pat. No. 5,850,622, issued on Dec. 15, 1998 to Anthony A. Vassiliou et al., describes a method of seismic data processing which provides a superior method of removing or attenuating some forms of seismic noise and can also be used as a basis for seismic attribute analysis and automatic trace editing. Vassiliou et al. do not show or suggest a multi-shooting approach to seismic modeling and acquisition according to the claimed invention.

Germany Patent document 2,453,873, published on Jun. 5, 1975, describes a technique wherein Fourier analysis of data such as atmospheric variations and vehicle vibrations, including acceleration and general dynamic forces is effected by using an instrument operating in real time. Germany '873 does not show or suggest a multi-shooting approach to seismic modeling and acquisition according to the claimed invention.

Soviet Union Patent document 972,444, published on Nov. 2, 1982, describes a method of acoustic well logging to measure parameters of various types of compressional waves. Soviet Union '444 does not show or suggest a multi-shooting approach to seismic modeling and acquisition according to the claimed invention.

An article entitled "MICROCOMPUTER ASSISTED, SINGLE BEAM, PHOTOACOUSTIC SPECTROMETER SYSTEM FOR THE STUDY OF SOLIDS", published in a magazine entitled "ANALYTICAL CHEMISTRY, VOL. 50, NO. 4" in April of 1978, describes a photoacoustic spectrometer system for the study of solid materials in detail. The article does not show or suggest a multi-shooting approach to seismic modeling and acquisition according to the claimed invention.

None of the above inventions and patents, taken either singularly or in combination, is seen to describe the instant invention as claimed.

SUMMARY OF THE INVENTION

The present invention is a method where several shot gathers can be generated simultaneously. The method is called a multi-shooting approach to seismic modeling and acquisition. A multi-shooting modeling method is disclosed which may be carried out on a computer system in either an explicit or an implicit manner. A multi-shooting acquisition method is also disclosed. As in the real world, the finite difference technique has the ability to generate elastic waves from several locations and at different time intervals simultaneously. The multi-shooting approach is based on the property of the finite difference technique. The fundamental problem associated with the multi-shooting method is that of decoding the various shot gathers which are recorded in a single gather. The inventive decoding solution exploits the fact that specific time delays can be imposed between the various shots and that two closely space shooting points produce nearly identical responses.

The cost of performing various shots simultaneously is almost identical to that of one shot. Furthermore, the cost of the decoding solution is negligible compared to that of one finite difference solution. Thus, the savings in computation time by using the multi-shooting are significant; so significant that even the long standing problem of simulating a three dimensional seismic survey can be reduced to a matter of weeks and not years as is currently the case.

Seismic acquisition can also benefit from the multi-shooting technique. For instance, it can be used to improve the spacing between shot points, or to collect true three dimensional data and even to reduce the acquisition time. The spacing between shot points in marine seismic exploration systems is normally about 50 m. This spacing is essentially limited by the present shooting system like the 'flip-flop' technique used in marine seismic exploration systems. However, most modern processing tools which are based on the wave equation requires a spacing on the order of 12.5 m. Four simultaneous shots can be used to overcome this problem. The current three dimensional data acquisition with a shooting boat sailing along one direction and shooting only in that direction does not allow enough spacing between shot points for a full azumthal coverage of the sea surface or land surface. A multi-shooting can be designed to overcome this limitation by improving the spacing between shot positions. As for finite difference modeling, a multi-shooting acquisition can reduce the cost of the present acquisition cost be several fold while increasing coverage of the sea or land surface. The fundamental development needed is the decoding technique.

Although the multi-shooting concept is primarily targeted to seismic exploration and production, it can be used in other fields, including ground radar, electromagnetic reflection, other nondestructive material evaluation applications, and fluid flow simulations. While finite difference is preferred, equivalent discretization based on finite elements may also be used.

The modeling method may be carried out on a computer system in the form of computer software code. The hardware for implementing such computer software code is not particularly limitative, and the preferred embodiment has been designed for computer systems which normally include a keyboard and/or transducer (mouse) input devices, a resolution monitor, a printer system, a microprocessor based central processing unit, and a memory capability, such as a hard disk drive. Normally, the memory will store the computer software code according to the invention which includes program instructions defining the inventive controlling logic. The processing unit implements the programmed control instructions. The inventive controlling logic instructions may be coded in a variety of programming languages consistent and compatible with the associated hardware.

The implicit method for simulating a multi-shooting technique where a plurality of shots are generated comprises the steps:

(a) take wave equation $(D_{I,P}+M_{I,P}) F_P = Q_I$ and convert that equation in the frequency-space domain, wherein $D_{I,P}$ is a block off-diagonal spatial differentiation operator matrix that is specific for each type of wave motion under consideration, wherein $M_{I,P} = M_{I,P}(x)$ is a medium matrix that is representative for the properties of the media in which the wave propagation, and $Q_I = Q_I(x,t)$ is a volume source density matrix that is representative for the action of the volume sources that generates the wavefield;

(b) discretize the spacial derivatives of the wave equation in the frequency-space domain which generates a linear system based on the discretized spacial derivative $Ax_i = b_i$, where $x_i$ is a vector containing the wavefield, $b_i$ is a vector containing scaled source terms, and A is a tri-diagonal matrix;

(c) compute the inverse matrix of A; and, (d) generate, for any given source $b_i$, the relationship $x_i = A^{-1}b_i$, wherein the vector $x_i$ contains the wavefield.

The explicit modeling method for simulating a multi-shooting technique where a plurality of shots are generated simultaneously and recorded in a single shot gather comprises the steps:

(a) let x denote a generic point in a three dimensional medium;

(b) let $x_s^{(i)}$ denote a generic source position;

(c) let $F_P(x,t)$ denote a field matrix of the wave motion at position x and time t; and, (d) solve the equation $$(D_{I,P}(x,t) + M_{I,P}(x))F_P(x,t) = \sum_{i=1}^{i=n} Q_I^{(i)}(x, t-\tau_i, x_s^{(i)})$$

wherein $D_{I,P}(x,t)$ is a block off-diagonal spatial differentiation operator matrix which is specific for each type of wave motion under consideration, wherein $M_{I,P}(x)$ is a medium matrix that is representative for the properties of the media in which the wave propagates, and wherein $Q_I(x,t)$ is a volume source density matrix that is representative for the action of the volume sources that generate the wavefield, wherein I and P denote the pertaining matrix elements and the summation convention for repeated subscripts applies, where n shots are generated simultaneously and recorded in a single shot gather $F_P(x,t)$, and wherein $\tau_i$ describes time delays between various shots.

The explicit modeling method for simulating a multi-shooting technique may also include the step (e) decoding the multi-shooting data into single shots, wherein the decoding step is preferably carried out utilizing a seismic time division multiple access technique or a code division multiple access technique. The explicit modeling method may also include the steps:

(e) positioning a plurality of remote recording units for receiving and recording shooting signals as a function of time during a recording period;

(f) positioning a plurality of shooting sources at different physical locations;

(g) triggering each shooting source during the recording period; and, (h) decoding the multi-shooting data into single shots, wherein the decoding step is preferably carried out utilizing a seismic time division multiple access technique or a code division multiple access technique.

The implicit modeling method and the explicit modeling method may also be configured in the form of computer software code for carrying out the associated steps.

A system for acquiring multi-shooting data preferably includes a plurality of remote recording units for receiving and recording signals resulting from wave motion as a function of time during a recording period, a plurality of shooting sources each positioned at a different physical location and that are all triggered during the recording period and, decoding means operable after the recording period to accurately decode the multi-shooting data into single shots, wherein the decoding means preferably utilizes a seismic time division multiple access technique or a code division multiple access technique.

It is to be understood that the present invention is not limited to the embodiments described above, but encompasses any and all embodiments within the scope of the following claims.

Accordingly, it is a principal object of the invention to provide a multi-shooting approach to seismic modeling and acquisition.

It is an object of the invention to provide improved elements and arrangements thereof in a multi-shooting approach to seismic modeling and acquisition for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present is a multi-shooting approach to seismic modeling and acquisition. A multi-shooting modeling method is disclosed which may be carried out on a computer system in either an explicit or an implicit manner and will be described later. A multi-shooting acquisition method is also disclosed. The multi-shooting concept is primarily targeted to seismic exploration and production. However, it can be used in other fields, including ground radar, electromagnetic reflection, other nondestructive material evaluation applications, and fluid flow simulations. While finite difference is preferred, equivalent discretization based on finite elements may also be used. Before describing the acquisition method of the present invention relating to the processing of seismic reflection signals, a seismic data acquisition system which may be used in the generating and gathering of seismic reflection signals in accordance with the present invention will first be described.

The acquisition method of the present invention may be carried out in any type of exploration system, such as either a land seismic exploration system or a marine seismic exploration system. A common type of seismic source is an explosive charge having an electrical detonator that is connected to a trigger by a cable. Any other source such as a chirp signal generator, a gas gun, or an air gun could be used. During a predetermined recording period multiple seismic sources are triggered. The seismic waves generated by the seismic sources travel along ray paths and, after reflection from a subsurface earth layer, are detected by transducers.

There are various ways of acquiring marine seismic data, depending on receiver locations. One thing that is common to all these acquisition geometries is the shooting boat which tows one or two sources. Each of these sources consists of a single airgun or an array of airguns which are fired at a regular interval in space and in time. In towed streamer case, the same shooting boat also tows a set of streamers containing receivers. In vertical cable acquisition, the receiver arrays are deployed vertically in the water column and the shooting boat is quite small, it tows only sources without the cumbersome streamers. In walkaway vertical seismic profile, the arrays are deployed inside a borehole and the shooting boat also tows only sources. In ocean bottom cable acquisition, the receivers are deployed at the sea floor, the shooting boat only tows the sources.

A typical shooting boat tows two sources. These sources are fired alternatively every 25 m (i.e., individually every 50 m) which allows more data to be recorded quickly than when using only one source. This shooting technique is known as 'flip-flop'. The drawback of 'flip-flop' shooting is that the spacing between shots is 50 m while most modern seismic data processing tools require 25 m spacing or less. By replacing each source by an array of two sources separated by 25 m, a dataset can be produced with a source spacing of 25 m. Each source can actually be replaced by an array of several sources (more than two). This leads to a multi-shooting survey. So, instead of the shooting boat towing two sources, it will tow several sources just like it is presently towing several streamers. The present technology for synchronizing the shooting time and orienting the shot position can be used to deploy and to fire these different sources at desired space and time intervals Furthermore, several shooting boats can be simultaneously used to increase even further the number of shots. So, the multi-shooting in marine can be achieved by increasing the number of sources towed by the shooting boat and/or increasing the number of shooting boats. In towed streamer acquisition, the shooting boat tows the streamer in addition to sources. In a multi-shooting configuration, the experiment can be divided in two sets of boats: (1) the receiving boats which tow the streamers; and (2) the shooting boats which tow the sources.

The two commonly used sources in land seismic surveys are dynamite explosion and vibroseis. Beginning with dynamite sources, explosive sources are deposited in a shot hole. The multi-shooting can be carried out by detonating several of these explosions simultaneously, instead of one after another, by radio command from an instrument truck.

The other seismic source commonly used in land seismic surveys is vibroseis. The base plate of a vibrator is driven by a continuous, variable-frequency, sinusoidal-like signal. At any particular time, the signal has an instantaneous frequency that lies within the seismic bandwidth. The driving signal is called a sweep. Different vibrators can be used simultaneously to generate seismic waves and produce a multi-shooting acquisition.

Although, the modeling method is fully elastic and three-dimensional, for simplicity in the formulation, the mathematical description will be limited to the acoustic wave equation with constant density in a two-dimensional medium. The modeling method may be carried out using either explicit modeling or implicit modeling.

The modeling method may be carried out on a computer system in the form of computer software code. The hardware for implementing such computer software code is not particularly limitative, and the preferred embodiment has been designed for computer systems which normally include a keyboard and/or transducer (mouse) input devices, a resolution monitor, a printer system, a microprocessor based central processing unit, and a memory capability, such as a hard disk drive. Normally, the memory will store the computer software code according to the invention which includes program instructions defining the inventive controlling logic. The processing unit implements the programmed control instructions. The inventive controlling logic instructions may be coded in a variety of programming languages consistent and compatible with the associated hardware.

First, consider explicit modeling. Let $(x,z)$ denote a generic point in the medium, $(x_i, z_i)$ a generic source position, and $P_i(x,z,t)$ the pressure variation at point $(x,z)$ and time t for a source at $(x_i, z_i)$. The variable t is reset to zero at each new shot. The problem of simulating a seismic survey of n shot gathers corresponds to solving the differential equation:

$$\left(\frac{1}{c^2(x,z)}\frac{\partial^2}{\partial t^2} - \left[\frac{\partial^2}{\partial x^2} - \frac{\partial^2}{\partial z^2}\right]\right) P_i(x, z, t) = S_i(t)\delta(x - x_i)\delta(z - z_i), \quad (1)$$

n time.

The inventive multi-shooting method attempts to solve rather the following equation:

$$\left(\frac{1}{c^2(x,z)}\frac{\partial^2}{\partial t^2} - \left[\frac{\partial^2}{\partial x^2} - \frac{\partial^2}{\partial z^2}\right]\right) P(x, z, t) = \sum_{i=1}^{i=n} S_i(t + \tau_i)\delta(x - x_i)\delta(z - z_i), \quad (2)$$

where all the n shots are generated simultaneously and recorded in a single shot gather $P(x,z,t)$. The parameter $\tau_i$ describes time delays between the various shots. Actually, $P(x,z,t)$ is related to the individual shot $P_i(x,z,t)$, $$P(x, z, t) = \sum_{i=1}^{i=n} P_i(x, z, t - \tau_i). \quad (3)$$

Figure 1:
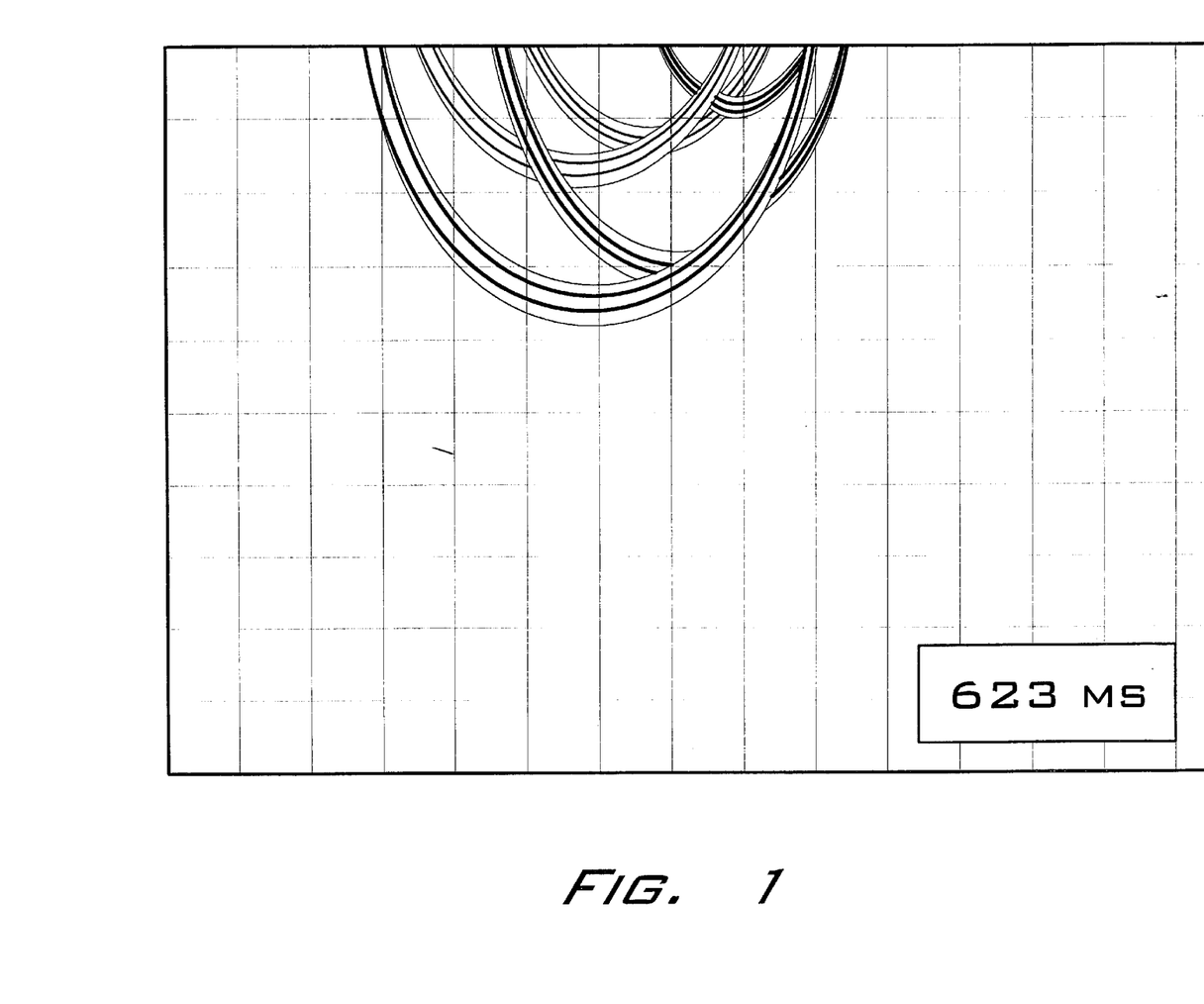
FIG. 1 is a snapshot at 623 ms from four shooting points according to the present invention.
Figure 2:
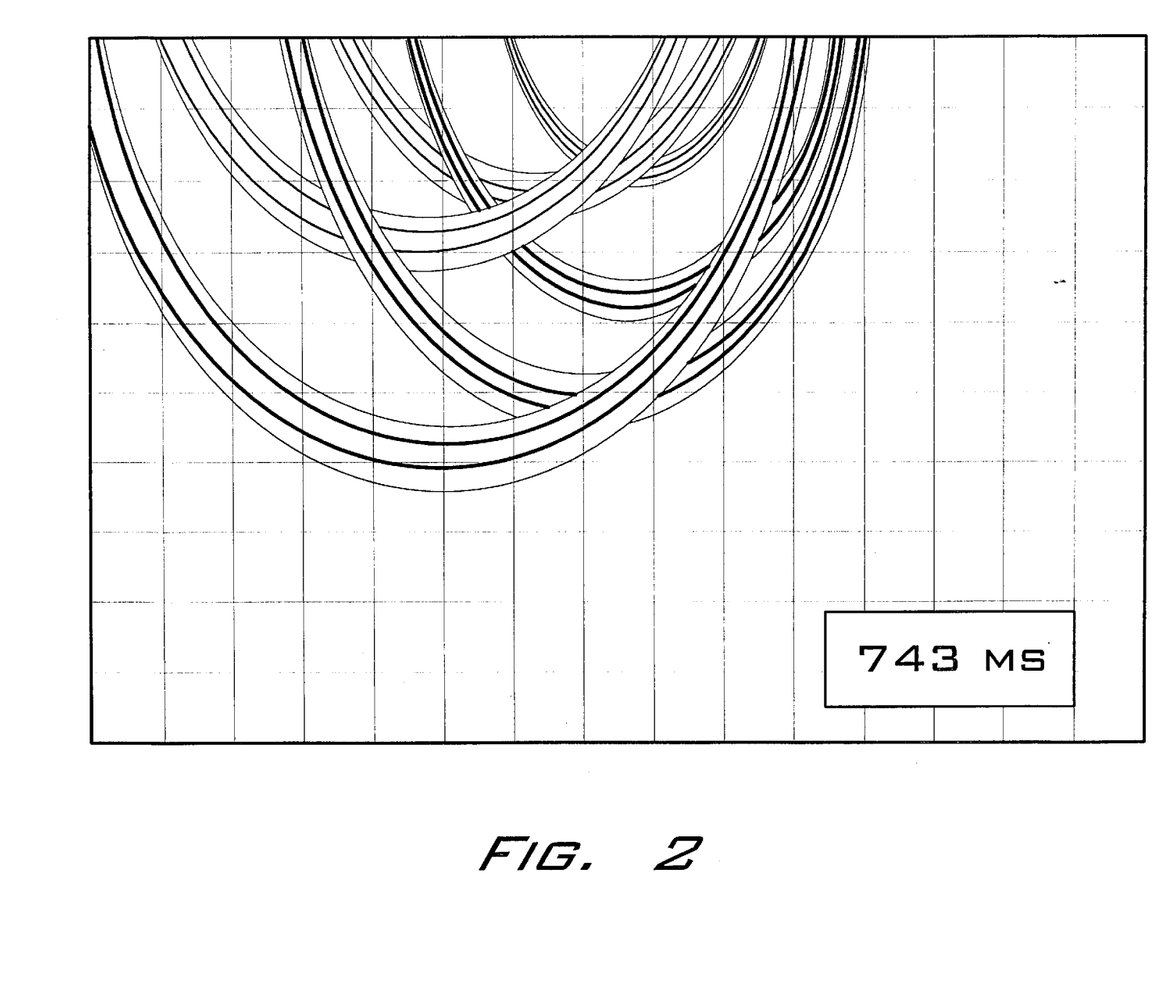
FIG. 2 is a snapshot at 743 ms from four shooting points according to the present invention.
Figure 3:
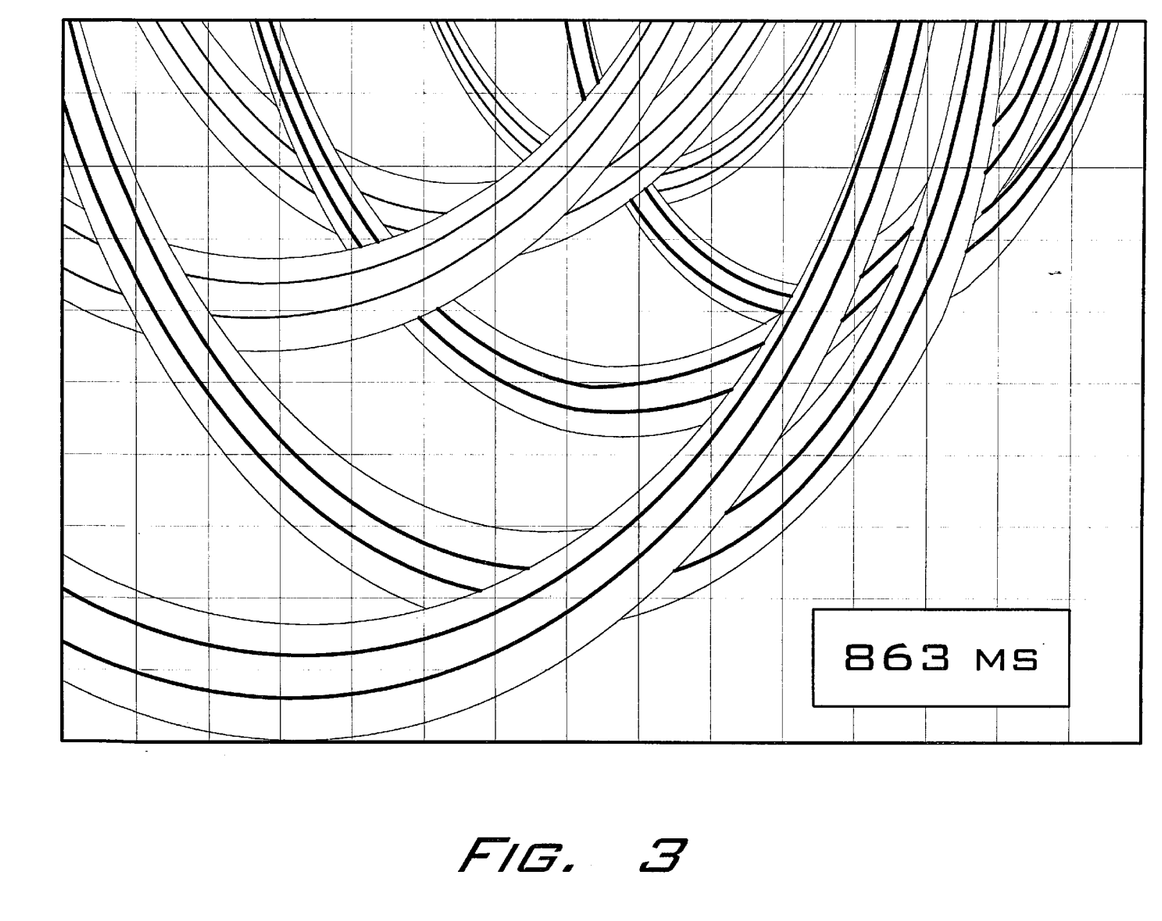
FIG. 3 is a snapshot at 863 ms from four shooting points according to the present invention.
Figure 4:
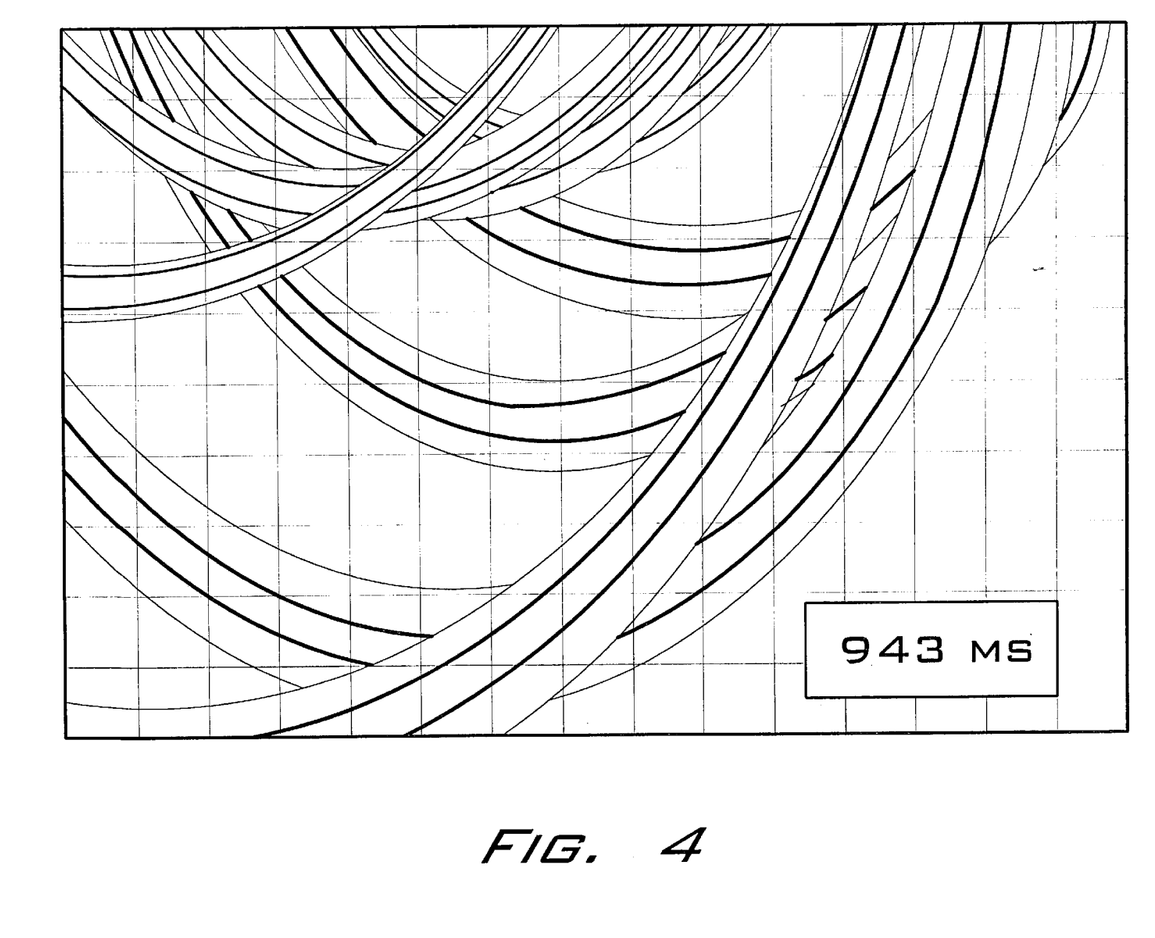
FIG. 4 is a snapshot at 943 ms from four shooting points according to the present invention.
Figure 5:
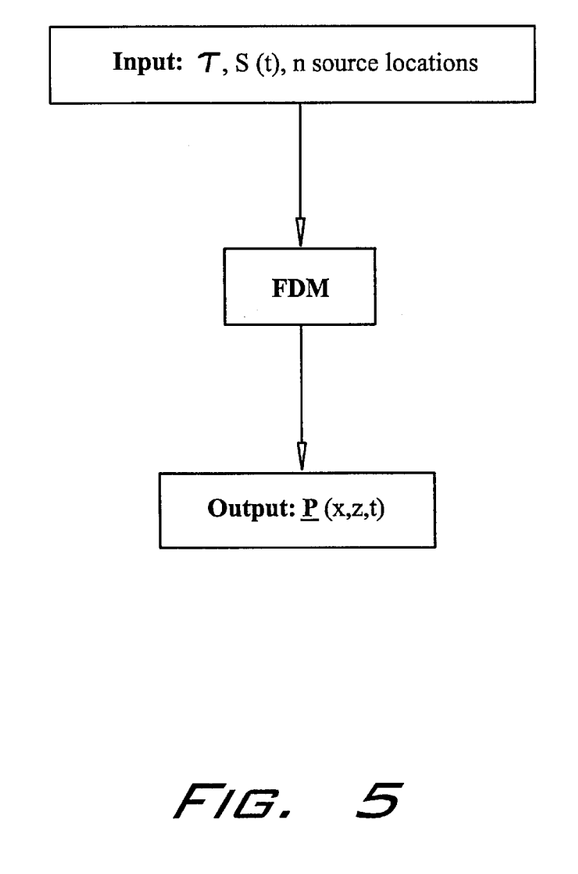
FIG. 5 is a flow chart of a multi-shooting concept according to the present invention.

The multi-shooting method as described above has essentially two components: (i) the computation of $P(x,z,t)$ using Equation (2); and (ii) the decoding of the various shots $P_i(x,z,t)$ from $P(x,z,t)$. The computation of $P(x,z,t)$ is performed with existing finite difference modeling code by simply modifying the user interface to include shooting from several locations. FIGS. 1–4 illustrate the case where four shots were generated simultaneously from four different locations (in Equation (2), we have taken $S_1=S_2=S_3=S_4$ and $\tau_1=\tau_2=\tau_3=\tau_4=0$). The snapshot at t=863 ms, as shown in FIG. 3, clearly shows the four compressional (P-wave) wavefronts. The finite-difference code used in these computations is based the staggered grid method.

One form of the explicit finite difference method of Equation (1) and (2) without the source term is $$P_{i,k}^l = 2P_{i,k}^l - P_{i,k}^{l-1} + \frac{\tau^2 c^2}{h^2}[P_{i-1,k}^l + P_{i+1,k}^l + P_{i,k+1}^l - 4P_{i,k}^l] \quad (4)$$

where $$P_{i,k}^l = P(i\Delta x, k\Delta x, l\Delta t) = P(x,z,t), \; l=0,1,\ldots,L; \; i-1,\ldots,I; \; k=1,\ldots,k. \quad (5)$$

$\Delta x$ is the spacing between discrete points in the medium (grid size) and $\Delta t$ is the time step. Equation (4) means that the computation of $P_{i,k}^{l+1}$ at time step l+1 requires the two previous steps l and l−1. This shows that the explicit finite difference method is essentially a time recursive method. Equation (4) is the time-space (x-t) domain implementation of explicit finite difference method. Alternatively, the time-wave number (k-t) domain implementation of explicit finite difference method where the spatial derivatives of (1) and (2) are constructed by Fourier transform can also be used. Other discretization techniques like finite-element and finite volume can also be used to implement the multi-shooting concept described in Equations (1) and (2).

The simulations of seismology are not limited to the elastic wave equation, they also include electromagnetic fields and reservoir flow data. The seismic data are based on elastic wave equations, electromagnetic fields are based on Maxwell's equations and reservoir flow data are based on the diffusion equation. The following description is a generalization of multi-shooting to these areas. Let the field matrix $F_P=F_P(x,t)$ of the wave motion be composed of the components of the two wavefield quantities whose inner product represents the area density of power flow (Poynting vector). Then, $F_P$ satisfies a system of linear, first-order, partial differential equations of the general form $$(D_{I,P} + M_{I,P}) F_P = Q_I \quad (6)$$

where the uppercase letters I and P denote the pertaining matrix elements and the summation convention for repeated subscripts applies. In Equation (6), $D_{I,P}$ is a symmetrical, block off-diagonal spatial differentiation operator matrix that contains the operator $\delta_P$ in a homogeneous linear fashion that is specific for each type of wave motion under consideration, $M_{I,P}=M_{I,P}(x)$ is the medium matrix that is representative for the properties of the (arbitrary, inhomogeneous, anisotropic) media in which the wave propagation and $Q_I=Q_I(x,t)$ is the volume source density matrix that is representative for the action of the volume sources that generates the wavefield. Equation (6) is valid for seismic data as well as electromagnetic fields. In fact, for acoustic waves in fields, $F_P=[p,v_1,v_2,v_3]^T$, where p is the acoustic pressure, $v_r$ is the particle velocity and $Q_I=[q,f_1,f_2,f_3]^T$, where q is the volume source density of injection rate and $f_k$ is the volume source density of force;

for elastic waves is solids, $F_P=[p,v_1,v_2,v_3,-\tau_{1,1},-\tau_{1,2},-\tau_{1,3},\ -\tau_{2,1},-\tau_{2,2},-\tau_{2,3},-\tau_{3,1},-\tau_{3,2},-\tau_{3,3},]^T$, where $v_r$ is the particle velocity and $\tau_{pq}$ is the dynamic stress, and $Q_{I=[f1},f_2,f_3,h_{1,1},h_{1,2},h_{1,3},h_{2,1},h_{2,2},h_{2,3},h_{3,1},h_{3,2},h_{3,3},]$, where $f_k$ is the volume source density of force and $h_{i,j}$ is the volume density of the deformation rate; and, for electromagnetic fields, $F_P=[E_1,E_2,E_3,0,-H_3,\ H_2,0, H_1,-H_2,H_1,0]^T$, where $E_t$ is electric field strength and $H_p$ is a magnetic field strength, and $Q_I=[J_1,J_2,-J_3,0,K_3, K_2,-K_3,0,K_1,K_2,-K_1,0]^T$, where $J_k$ is the volume source density of electric current and $K_j$ is the volume source density of magnetic current.

The problem of simulating a seismic survey of η shot gathers corresponds to solving the differential equation $$(D_{T,P}(x,t)+M_{I,P}(x)) F_P^{(i)}(x,t)=Q_I^{(i)}(x,t-\tau_i,x_s^{(i)}) \quad (7)$$

n time.

The inventive multi-shooting method attempts to solve rather the following equation:

$$(D_{T,P}(x,t) + M_{I,P}(x))F_P(x,t) = \sum_{i=1}^{i=n} Q_I^{(i)}(x, t - \tau_i, x_s^{(i)}) \quad (8)$$

where all the n shots are generated simultaneously and recorded in a single shot gather $F_P(x,t)$. Equations similar to (6), (7), and (8) can also be established for reservoir flow data.

So far, the discussion of multi-shooting has been limited to two types of finite difference modeling implementations; staggered grid and the pseudo methods. Although not widely known, there is another important form of implementation of finite difference modeling called the implicit method. It consists of taking the Fourier transform of (1) with respect to time so that timesteps are implicitly computed through temporal frequencies. Thus, the time derivatives are reduced multiplication operations. However, the spatial derivatives are computed by classical second order or fourth order finite difference. After some algebra, (1) can be reduced to a linear system:

$$Ax_i=b_i, \quad (9)$$

where $x_i$ is the vector containing the wavefield $P_i(x,z,w)$; $b_i$ is the vector containing scaled source terms and A is a tri-diagonal matrix containing the finite difference modeling stencils. There are two families of solutions for this linear system: a direct method and an iterative method. For the iterative method, the multi-shooting described earlier can be used without any modification as Equation (2) can also be reduced to a linear system:

$$Ax = \sum_{i}^{n} b_i, \quad (10)$$

where x is a sum of $x_i$ with appropriate time delay corrections There is no advantage in using the multi-shooting with implicitly finite difference modeling over staggered grid method or pseudo method if the linear system is solved iteratively. Moreover, the memory requirement of the implicit finite difference method is about 18 times that of staggered grid method.

The interesting aspect of the implicit finite difference method of multi-shooting is in the direct method where the inversion of the matrix A is used to solve the system instead of iterative solution. Notice that the matrix A is independent of the shooting points, therefore its inverse is computed once and can be used for any shooting point: $x_i=A^{-1}b_i$. Although not yet possible with existing computers, the direct method is attractive solution because the multi-shooting can be performed without the decoding step.

The fundamental problem associated with the multi-shooting concept is that of decoding or retrieving the various shots $P_i(x_r,z_r,t)$ which are recorded in a single gather $P(x_r,z_r,t)$. Not that $(x_r,z_r)$ represents the receiver point. Three parameters control the inventive decoding technique:

the distance between shots. For given two shot points $(x_i,z_i)$ and $(x_j,z_j)$, the distance is defined as $$d=\sqrt{(x_i-x_j)^2+(z_i-z_j)^2}$$

the delay between shots. For two shots fired at $\tau_i$ and $\tau_j$, the delay between the two shots is defined as $\Delta\tau=\tau_j-\tau_i$, the source signature, $S_i(t)$ associated to each shot, i.e., its phase and amplitude spectrum.

Two decoding methods are described herein instead of one because the desired choice of these three parameters for a particular decoding method is not necessarily optimal for all the acquisition scenarios.

The concept of multi-shooting is similar to that of multiple access technology widely used in communication applications like cellular telephone where several users can share the same telephone line. One of the decoding methods described is an adaptation of the decoding method commonly employed in communication applications, known as code division multiple access (CDMA). The other two decoding methods used in communication applications are time division multiple access (TDMA), and frequency division multiple access (FDMA). They can also be adapted to the inventive multi-shooting method. However, a decoding method which is more suitable to decoding the multi-shooting method is hereinafter referred to as seismic time division multiple access (STDMA).

STDMA is based on two principles:

known time delay, greater than the duration of the source signature, can be introduced between the various shooting points as described in Equation (3); and, two closely spaced shooting points produce almost identical responses; $d \leq 50$ m and no assumption is needed on the source signatures.

Figure 6:
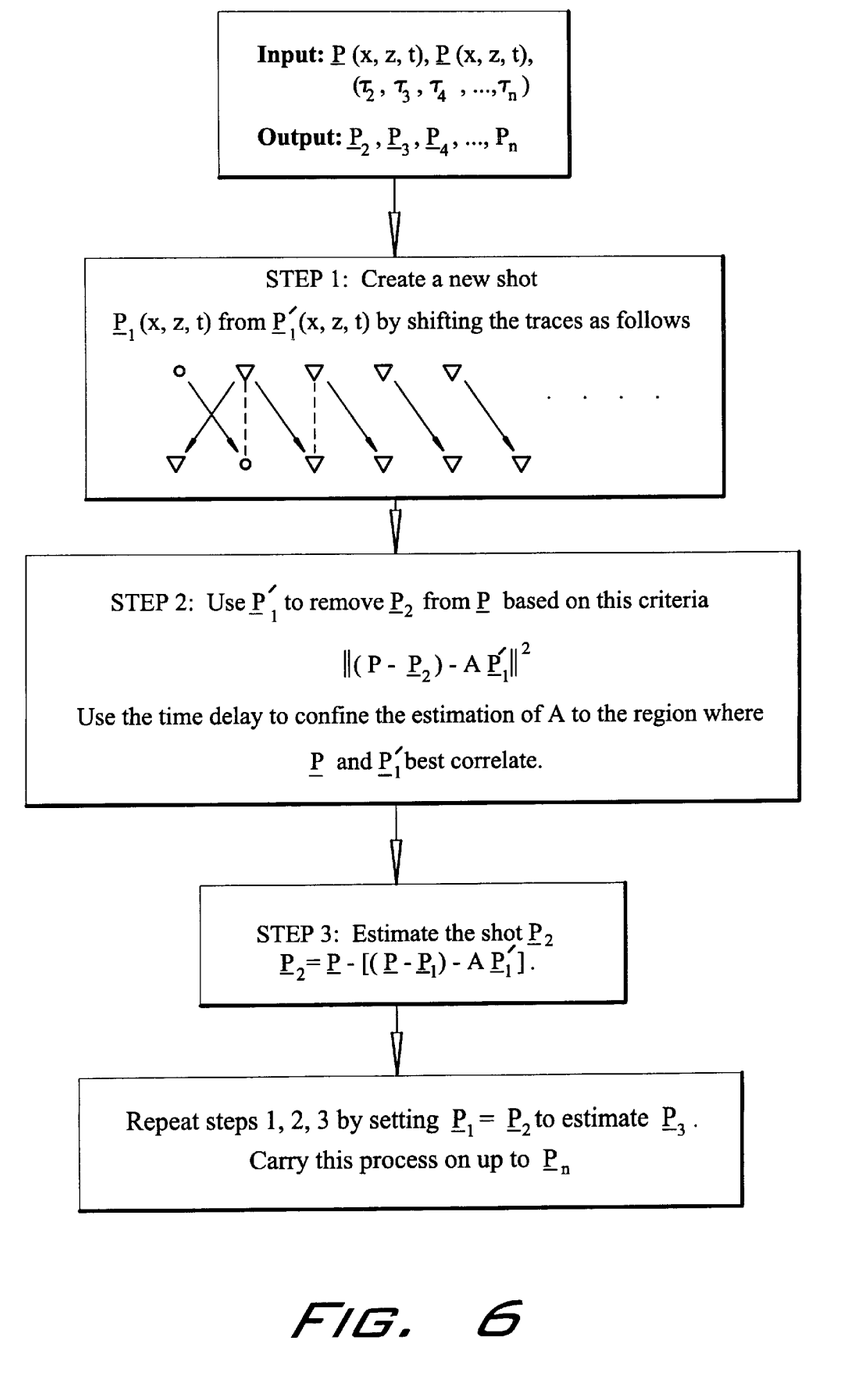
FIG. 6 is a flow chart of the decoding procedure according to the present invention.
Figure 7A:
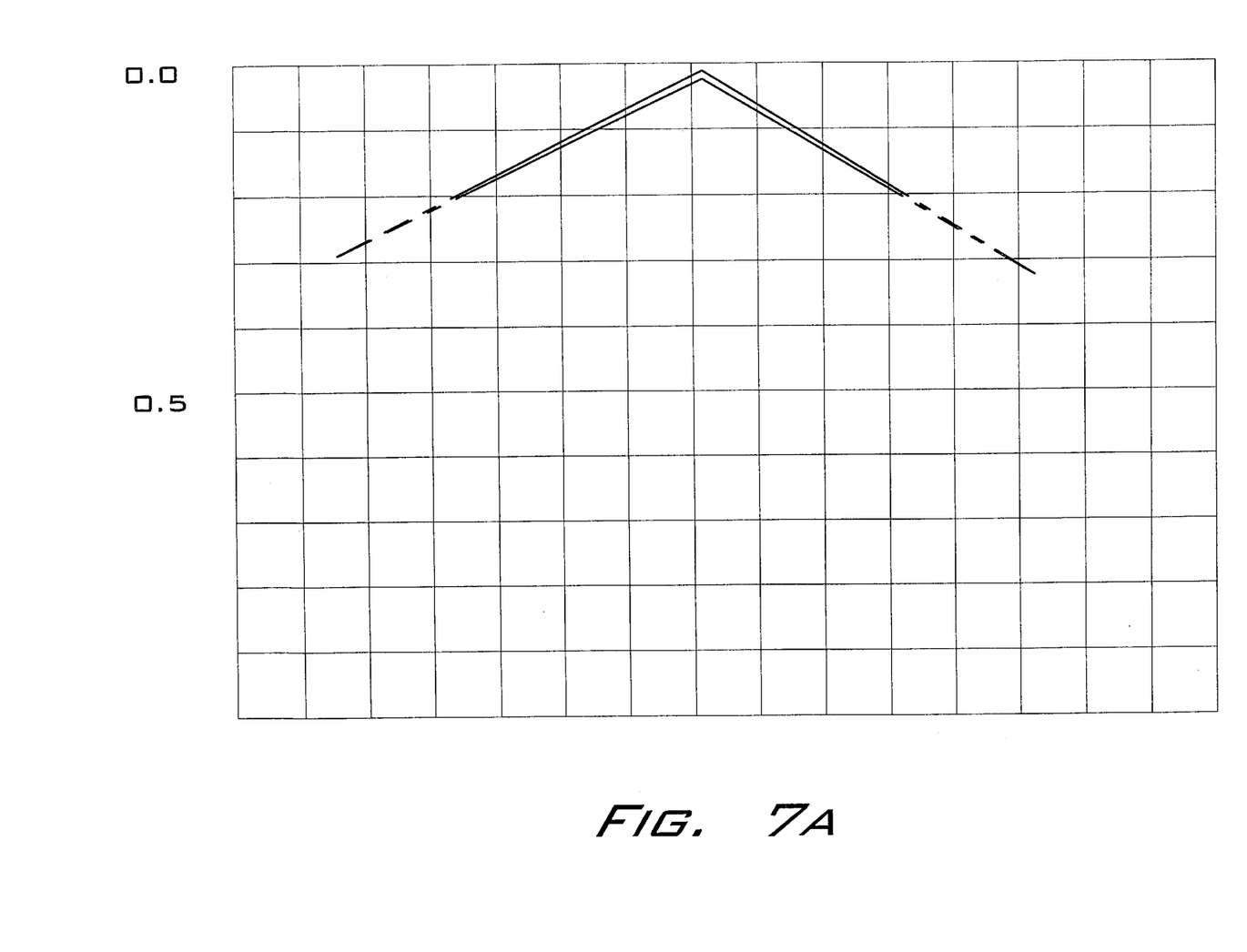
FIG. 7A is an example of decoding of a single shot gather from a single gather of four shots.
Figure 7B:
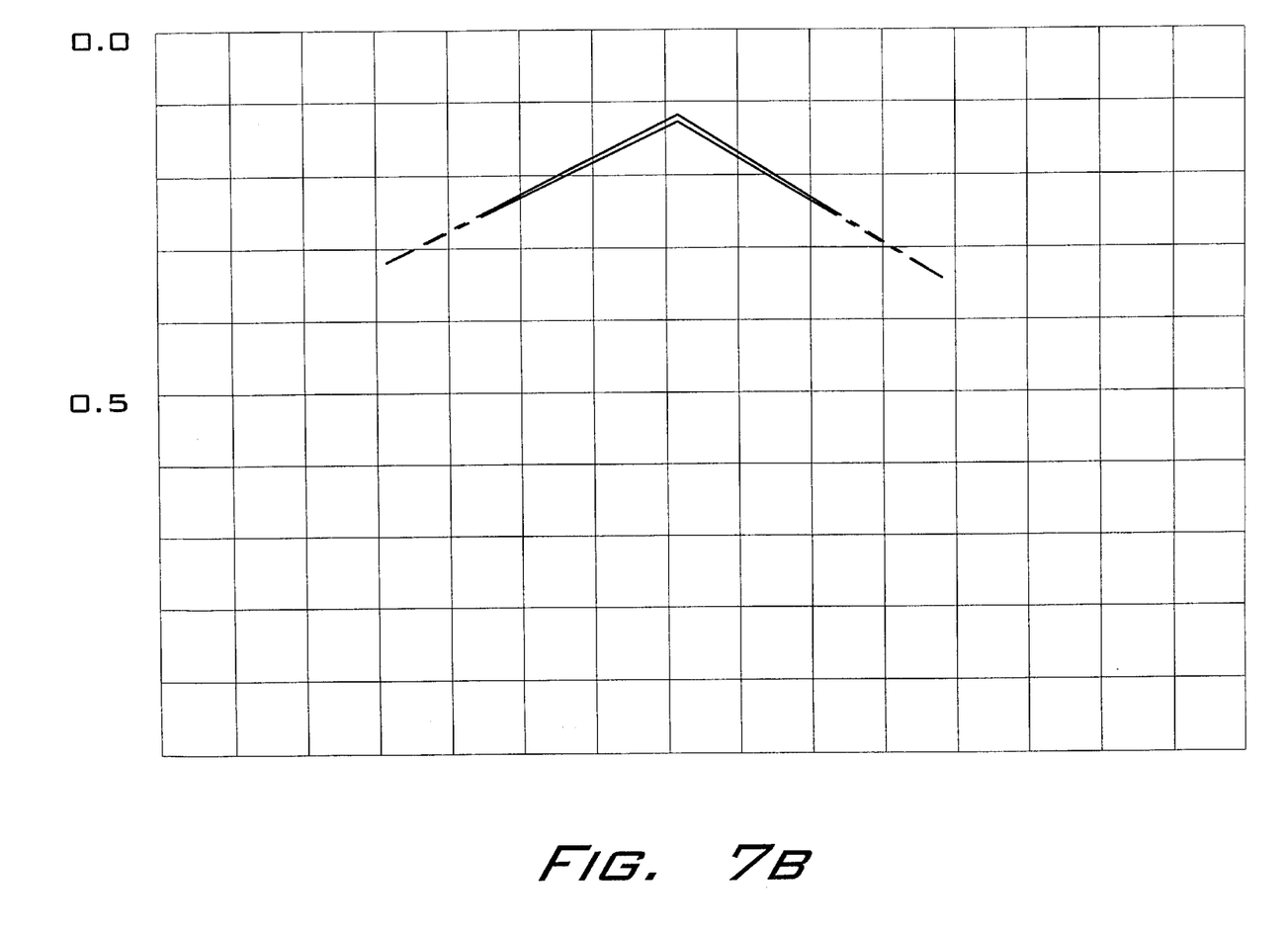
FIG. 7B is an example of decoding of a single shot gather from a single gather of four shots.
Figure 7C:
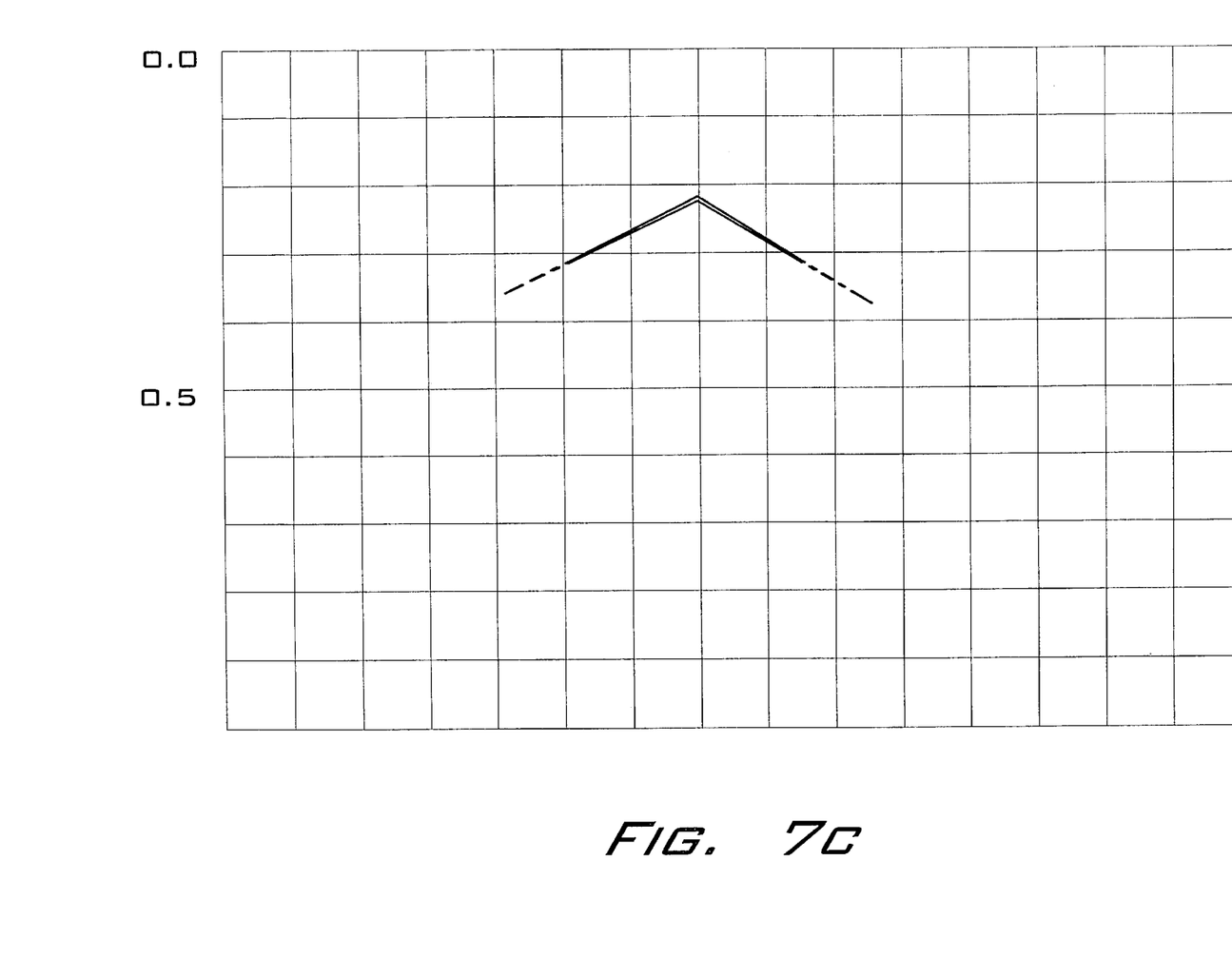
FIG. 7C is an example of decoding of a single shot gather from a single gather of four shots.
Figure 7D:
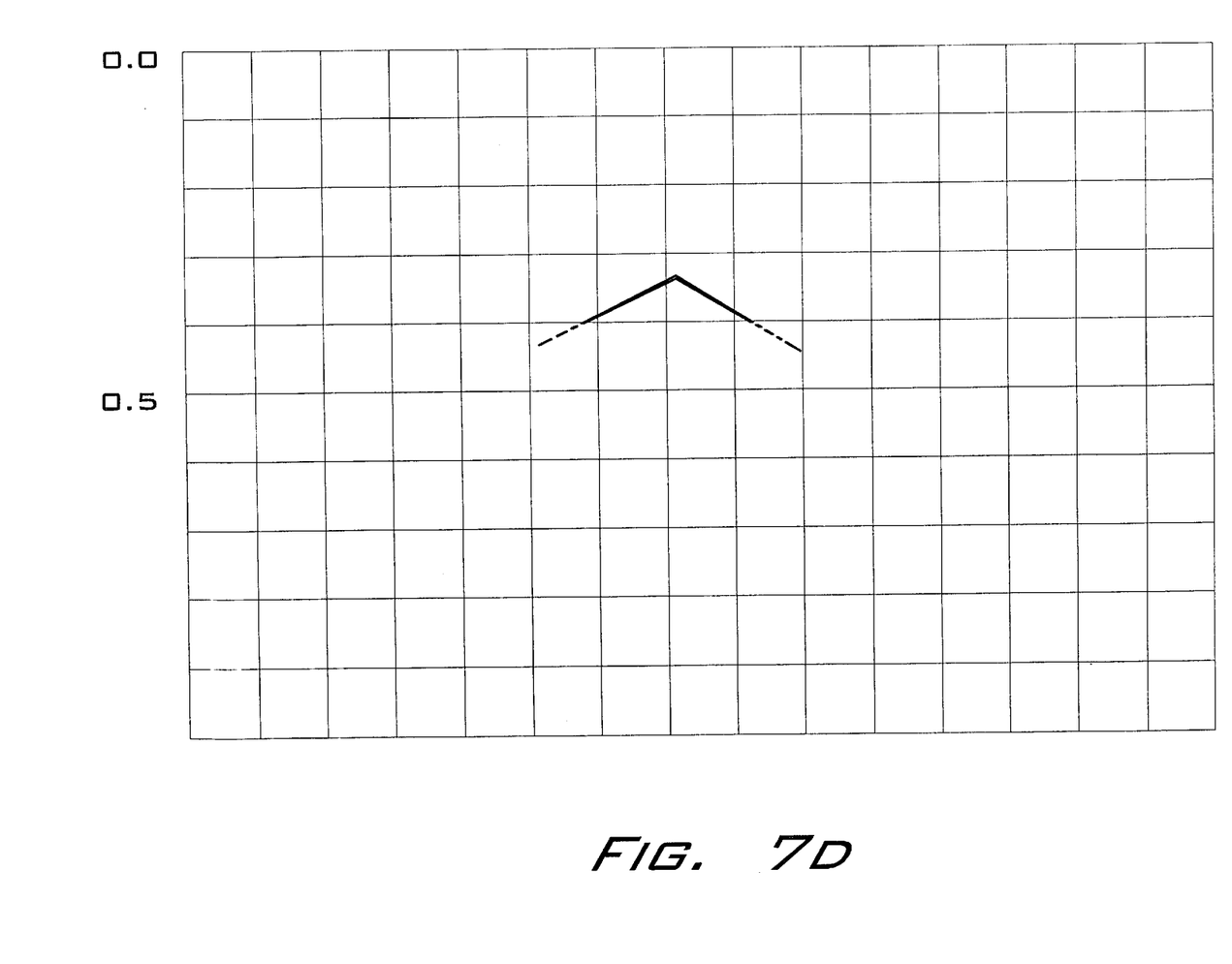
FIG. 7D is an example of decoding of a single shot gather from a single gather of four shots.

A multi-shooting survey acquired under these circumstances car be decoded using the algorithm described in FIG. 6. The inputs of this algorithm are one recorded wavefield $P(s^r,z_r,t)$ corresponding to multi-shooting, one reference wavefield $P_1(x_r,z_r,t)$ corresponding to a single shot and the time delay, $\Delta\tau$ between adjacent shots. We would like to recover $P_2(x_r,z_r,t)$, $P_3(x_r,z_r,t)$, $P_4(x_r,z_r,t)$, etc. As $P_1(x_r,z_r,t)$ is known, the retrieval begins for $P_2(x_r,z_r,t)$ from $P(x_r,z_r,t)$. This can be done in the following three steps:

(1) a wavefield which resembles $P_2(x_r,z_r,t)$ as closely as possible is attempted to be created by using the reciprocity between source and receivers where it is possible and by shifting the data as described in FIG. 6. The resulting field is named $P_1'(x_r,z_r,t)$.

(2) $P_2(x_r,z_r,t)$ is removed from $P(x_r,z_r,t)$ by using $P_1'(x_r,z_r,t)$. This problem is similar to that of finding a scalar function A which minimizes $$F(A)=\|(P-P_1)-AP_1'\|_2. \quad (11)$$

By using the known time delay between $P_1(x_r,z_r,t)$ and $P_1(x_r,z_r,t)$, this optimization problem can be solved with a constraint which restricts the estimation of A to the region where $P_2(x_r,z_r,t)$ and $P_1'(x_r,z_r,t)$ correlate thus treating the other correlations as colored noises. The estimation of the scaling function A involves the computation of the cross-correlation between $P(x,z,t)$ and the reference field $P'_1(x,z,t)$.

(3) $P_2(x_r,z_r,t)$ is estimated by first computing the field P, i.e.

$$\Delta P=(P-P_1)-AP_1', \quad (12)$$

which contains all the shots except $P_1$ and $P_2$ so that $$P_2=P-\Delta P-P_1. \quad (13)$$

Figure 8:
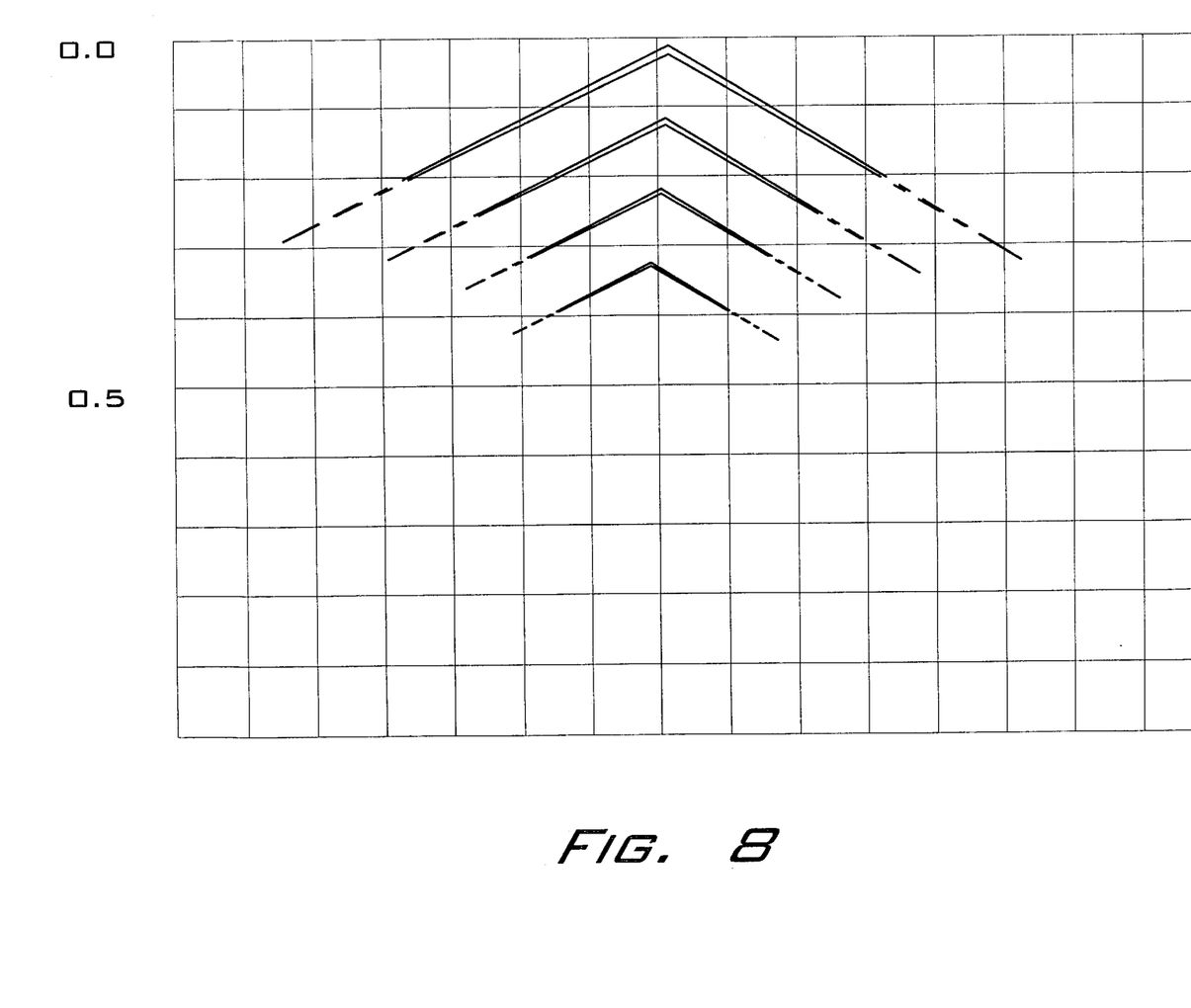
FIG. 8 is an example of a single shot gather from four shots.

Notice that this process preserves the amplitude and phase of the resulting $P_2$. This process is carried on by setting $P_1=P_2$ and seeking $P_3$. This can be continued recursively until all the shots are decoded from P. To enhance the quality of this decoding on seismic data, it is desirable to choose a $\Delta\tau$ greater than the duration of the source signature to properly use the constraint in step 2. Also, the spacing between shot points must be less than 50 m. FIGS. 7A–7D show the preliminary results of our decoding method shown in FIG. 8. The distance between shots in this case is 25 meters and the time delay between shots is 100 ms. We can see that the separation of several seismic shots is possible. As can be seen, the separation of several seismic shots is possible. As can In the CDMA decoding method, each source $S_i(t)$ is assigned a pseudo random number (PN) code (which is a sequence of polarities). This assignment is done by convolving the PN code by the source signature $S_i(t)$. A different PN code is assigned to each shot point. These PN code sequences are chosen to be mutually orthogonal. Existing technique used in communication theory for generating mutually orthogonal PN codes can be used here without modification. A wavefield $P_i$ is extracted from P in CDMA method by simply convolving the PN code corresponding to the shot point it with the data P. Notice that the PN code sequences must be choser with special care to ensure that their mutual orthogonality is preserved through wave propagation.

Although the multi-shooting concept is primarily targeted to seismic exploration and production, it can be used in other fields, including ground radar, electromagnetic reflection, other nondestructive material evaluation applications, and fluid flow simulations. While finite difference is preferred, equivalent discretization based on finite elements may also be used.

In summary, it is noted that the implicit method for simulating a multi-shooting technique where a plurality of shots are generated preferably comprises the steps:

(a) take wave equation $(D_{I,P}+M_{I,P})F_P=Q_I$ and convert that equation in the frequency-space domain, wherein $D_{I,P}$ is a block off-diagonal spatial differentiation operator matrix that is specific for each type of wave motion under consideration, wherein $M_{I,P}=M_{I,P}(x)$ is a medium matrix that is representative for the properties of the media in which the wave propagation, and $Q_I=Q_I(x,t)$ is a volume source density matrix that is representative for the action of the volume sources that generates the wavefield;

(b) discretize the spacial derivatives of the wave equation in the frequency-space domain which generates a linear system based on the discretized spacial derivative $Ax_i = b_i$, where $x_i$ is a vector containing the wavefield, $b_i$ is a vector containing scaled source terms, and A is a tri-diagonal matrix;

(c) compute the inverse matrix of A; and, (d) generate, for any given source $b_i$, the relationship $x_i = A^{-1}b_i$, wherein the vector $x_i$ contains the wavefield.

The explicit modeling method for simulating a multi-shooting technique where a plurality of shots are generated simultaneously and recorded in a single shot gather preferably comprises the steps:

(a) let x denote a generic point in a three dimensional medium;

(b) let $x_s^{(i)}$ denote a generic source position;

(c) let $F_P(x,t)$ denote a field matrix of the wave motion at position x and time t; and, (d) solve the equation $$(D_{I,P}(x,t) + M_{I,P}(x))F_P(x,t) = \sum_{i=1}^{i=n} Q_I^{(i)}(x, t-\tau_i, x_s^{(i)})$$

wherein $D_{I,P}(x,t)$ is a block off-diagonal spatial differentiation operator matrix which is specific for each type of wave motion under consideration, wherein $M_{I,P}(x)$ is a medium matrix that is representative for the properties of the media in which the wave propagates, and wherein $Q_I(x,t)$ is a volume source density matrix that is representative for the action of the volume sources that generate the wavefield, wherein I and P denote the pertaining matrix elements and the summation convention for repeated subscripts applies, where n shots are generated simultaneously and recorded in a single shot gather $F_P(x,t)$, and wherein $\tau_i$ describes time delays between various shots.

The explicit modeling method for simulating a multi-shooting technique may also include the step decoding the multi-shooting data into single shots, wherein the decoding step is preferably carried out utilizing a seismic time division multiple access technique or a code division multiple access technique. The explicit modeling method may also include the steps:

(e) positioning a plurality of remote recording units for receiving and recording shooting signals as a function of time during a recording period;

(f) positioning a plurality of shooting sources at different physical locations;

(g) triggering each shooting source during the recording period; and, (h) decoding the multi-shooting data into single shots, wherein the decoding step is preferably carried out utilizing a seismic time division multiple access technique or a code division multiple access technique.

The implicit modeling method and the explicit modeling method may also be configured in the form of computer software code for carrying out the associated steps.

A system for acquiring multi-shooting data preferably includes a plurality of remote recording units for receiving and recording signals resulting from wave motion as a function of time duringa recording period, a plurality of shooting sources each positioned at a different physical location and that are all triggered during the recording period and, decoding means operable after the recording period to accurately decode the multi-shooting data into single shots, wherein the decoding means preferably utilizes a seismic time division multiple access technique or a code division multiple access technique.

It is to be understood that the present invention is not limited to the embodiments described above, but encompasses any and all embodiments within the scope of the following claims.

I claim:

1. A method for simulating a multi-shooting technique where a plurality of shots are generated simultaneously and recorded in a single shot gather, said method comprising the steps:

(a) let x denote a generic point in a three dimensional medium;

(b) let $x_s^{(i)}$ denote a generic source position;

(c) let $F_P(x,t)$ denote a field matrix of the wave motion at position x and time t;

(d) solve the equation $$(D_{I,P}(x,t) + M_{I,P}(x))F_P(x,t) = \sum_{i=1}^{i=n} Q_I^{(i)}(x, t-\tau_i, x_s^{(i)})$$

wherein $D_{I,P}(x,t)$ is a block off-diagonal spatial differentiation operator matrix which is specific for each type of wave motion under consideration, wherein $M_{I,P}(x)$ is a medium matrix that is representative for the properties of the media in which the wave propagates, and wherein $Q_I(x,t)$ is a volume source density matrix that is representative for the action of the volume sources that generate the wavefield, wherein I and P denote the pertaining matrix elements and the summation convention for repeated subscripts applies, where n shots are generated simultaneously and recorded in a single shot gather $F_P(x,t)$, and wherein $\tau_i$ describes time delays between various shots; and (e) decoding the multi-shooting data into single shots.

2. The method for simulating a multi-shooting technique according to claim 1, wherein said decoding step is carried out utilizing a seismic time division multiple access technique.

3. The method for simulating a multi-shooting technique according to claim 1, wherein said decoding step is carried out utilizing a code division multiple access technique.

4. A method for simulating a multi-shooting technique where a plurality of shots are generated simultaneously and recorded in a single shot gather, said method comprising the steps:

(a) let x denote a generic point in a three dimensional medium;

(b) let $x_s^{(i)}$ denote a generic source position;

(c) let $F_P(x,t)$ denote a field matrix of the wave motion at position x and time t;

(d) solve the equation $$(D_{I,P}(x,t) + M_{I,P}(x))F_P(x,t) = \sum_{i=1}^{i=n} Q_I^{(i)}(x, t-\tau_i, x_s^{(i)})$$

wherein $D_{I,P}(x,t)$ is a block off-diagonal spatial differentiation operator matrix which is specific for each type of wave motion under consideration, wherein $M_{I,P}(x)$ is a medium matrix that is representative for the properties of the media in which the wave propagates, and wherein $Q_I(x,t)$ is a volume source density matrix that is representative for the action of the volume sources that generate the wavefield, wherein I and P denote the pertaining matrix elements and the summation convention for repeated subscripts applies, where n shots are generated simultaneously and recorded in a single shot gather $F_P(x,t)$, and wherein $\tau_i$ describes time delays between various shots;

(e) positioning a plurality of remote recording units for receiving and recording shooting signals as a function of time during a recording period;

(f) positioning a plurality of shooting sources at different physical locations;

(g) triggering each shooting source during the recording period; and, (h) decoding the multi-shooting data into single shots.

5. The method for simulating a multi-shooting technique according to claim 4, wherein said decoding step is carried out utilizing a seismic time division multiple access technique.

6. The method for simulating a multi-shooting technique according to claim 4, wherein said decoding step is carried out utilizing a code division multiple access technique.

* * * * *